(12) United States Patent
Leonardson (10) Patent No.: US 6,705,166 B2
(45) Date of Patent: Mar. 16, 2004

(54) SMALL SIZE, HIGH CAPACITANCE READOUT SILICON BASED MEMS ACCELEROMETER

(75) Inventor: Ronald B. Leonardson, Redmond, WA (US)

(73) Assignee: Honeywell International, Inc., Morristown, NJ (US)

( * ) Notice: Subject to any disclaimer, the term of this patent is extended or adjusted under 35 U.S.C. 154(b) by 20 days.

(21) Appl. No.: 10/117,303

(22) Filed: Apr. 5, 2002

(65) Prior Publication Data

US 2002/0189355 A1 Dec. 19, 2002

Related U.S. Application Data (60) Provisional application No. 60/299,162, filed on Jun. 18, 2001.

(51) Int. Cl.[7] .............................. G01P 15/25; G01L 1/14
(52) U.S. Cl. .................. 73/514.32; 73/862.626
(58) Field of Search ......................... 73/514.32, 514.16, 73/514.29, 504.04, 504.12, 862.61, 862.626, 504.14, 862.381, 862.52; 361/280, 283.3, 301.1

(56) References Cited

U.S. PATENT DOCUMENTS 5,447,067 A * 9/1995 Biebl et al. .............. 73/514.32
5,948,981 A    9/1999 Woodruff ................. 73/514.29

FOREIGN PATENT DOCUMENTS

GB         2076970         * 12/1981

* cited by examiner

Primary Examiner—Helen Kwok
(74) Attorney, Agent, or Firm—Charles J. Rupnick (57) ABSTRACT

An apparatus and method for sensing accelerations and other forces. The apparatus having a cover plate having an inner portion and an outer portion, the inner portion being formed with a plurality of spaced apart electrodes projecting therefrom and defining spaces therebetween; and a proof mass having an inner portion being formed with a plurality of spaced apart electrodes projecting therefrom and defining spaces therebetween, an outer portion being coupled to the outer portion of the cover plate with the electrodes being electrically isolated from the cover plate electrodes, and the proof mass electrodes and spaces being aligned with the cover plate electrodes and spaces such that, when the inner portion of the proof mass is deflected toward the cover plate, the proof mass electrodes pass into the spaces between the cover plate electrodes, and a flexible suspension member coupled between the inner and outer proof mass portions.

35 Claims, 4 Drawing Sheets

SMALL SIZE, HIGH CAPACITANCE READOUT SILICON BASED MEMS ACCELEROMETER

This application claims the benefit of U.S. Provisional Application Serial No. 60/299,162, filed in the name of Ronald B. Leonardson on Jun. 18, 2001, the complete disclosure of which is incorporated herein by reference.

FIELD OF THE INVENTION

The present invention relates to force and acceleration measurement devices and methods, and in particular to micro-machined electromechanical sensor (MEMS) force and acceleration measurement devices employing circular ring diaphragm flexures in a small, rugged device having high pick-off sensitivity.

BACKGROUND OF THE INVENTION

The manufacture of micro-machined electromechanical sensor (MEMS) force and acceleration measurement devices is generally well-known for many different applications. Some applications require the device to provide very accurate measurements, while other applications require the device to withstand extreme shock and vibration environments.

Some applications require the measurement of force in extreme dynamic environments. For example, if a gun-launched projectile requires on-board acceleration sensing, the accelerometer providing the sensing must have a high pickoff sensitivity, and must be capable of operating in a high-G range with high-G shock survivability characteristics. An accelerometer in a gun-launch application must also exhibit low cross-axis sensitivity characteristics. All of these features must be contained in a low cost, small size accelerometer device. Unfortunately, known accelerometer devices lack one or more of the above features.

SUMMARY OF THE INVENTION

The present invention provides an inexpensive force measurement device having high pick-off sensitivity in a high-G input range which can operate in a high-G shock environment by providing, in contrast to the prior art devices and methods, a capacitance pick-off force sensor having a proof mass with spaced-apart tooth-type electrodes that is suspended by an annular suspension member. The device of the present invention provides easily implemented fabrication modification for trading-off between input range and pick-off sensitivity by altering etching periods of the annular suspension member. Alternatively, the input range and pick-off sensitivity can be traded-off by enlarging or reducing the area of the annular suspension member.

The apparatus and method of the present invention provide a force-sensing device having a cover plate and a proof mass, wherein the cover plate includes an inner portion and an outer portion, the inner portion is formed with a plurality of first spaced apart electrodes projecting therefrom that define first spaces therebetween; and the proof mass includes an inner portion that is formed with a plurality of second spaced apart electrodes projecting therefrom that define second spaces therebetween, an outer portion that is coupled to the outer portion of the cover plate with the second electrodes being electrically isolated from the first electrodes, and the second electrodes and spaces are aligned with the first electrodes and spaces such that, when the inner portion of the proof mass is deflected toward the inner portion of the cover plate, the second electrodes pass into the first spaces and the first electrodes pass into the second spaces, and a flexible suspension member that is coupled between its inner and outer portions.

According to one aspect of the invention, the force-sensing device of the invention is embodied having an annular flexure and electrodes in the cover plate and proof mass that are structured as cooperating pluralities of overlapping concentric rings.

According to another aspect of the invention, the force-sensing device of the invention is embodied as a double-layer force sensor formed of first and second substantially round semiconductor substrates each having substantially planar and parallel opposing offset top and bottom surfaces; a bottom cover plate is formed in the first substrate, the bottom cover plate including: a pattern of upright and spaced apart electrodes projecting from a central portion of the top surface, and an upright annular ridge portion projecting from a peripheral edge portion of the top surface; and a proof mass is formed in the second substrate, the proof mass including: a cooperating upright annular ridge portion projecting from a peripheral edge portion of the bottom surface and being fixed to the ridge portion of the bottom cover plate, a central portion flexibly suspended from the annular ridge portion, and a cooperating pattern of upright and spaced apart electrodes projecting from the central portion of the bottom surface and offset relative to the pattern of electrodes on the top surface of the bottom cover plate such that the cooperating pattern of electrodes passes between the pattern of electrodes on the bottom cover plate when the cooperating annular ridge portion of the proof mass is engaged with the annular ridge portion on the top surface of the bottom cover plate.

According to another aspect of the invention, the proof mass is formed as an annular flexure suspending the central portion from the annular ridge portion.

According to another aspect of the invention, the pattern of electrodes on the top surface of the bottom cover plate and the cooperating pattern of electrodes on the bottom surface of the proof mass are each further formed as a concentric pattern of circular electrodes.

According to another aspect of the invention, the cooperating annular ridge portion on the bottom surface of the proof mass is fixed with the annular ridge portion of the top surface of the bottom cover plate by an insulating bonding agent.

According to yet another aspect of the invention, the force-sensing device of the invention is embodied as a three-layer force sensor, having a proof mass positioned between first and second cover plates for closed loop operation. Accordingly, the three-layer force sensor is formed of first and second cover plates each formed in respective first and second substantially round semiconductor substrates having substantially planar and parallel opposing offset first and second surfaces, one of the first and second surfaces of each of the first and second cover plates having an annular bonding region, and a central portion positioned within the annular bonding portion and having a plurality of upright and spaced apart electrodes projecting therefrom; and a proof mass positioned between the first surface of the first cover plate and the first surface of the second cover plate, the proof mass being formed in a third substantially round semiconductor substrate having substantially planar and parallel opposing offset first and second surfaces, each of the first and second surfaces having an annular bonding region, each of the annular bonding regions on the first and second proof mass surfaces being bonded to the annular bonding region of one of the first and second cover plates, a central portion positioned within the annular bonding portion and having a plurality of upright and spaced apart electrodes projecting therefrom, each of the electrodes projecting from the first side of the proof mass being aligned with interstices formed between the spaced part electrodes projecting from the surface of the first cover plate, and each of the electrodes projecting from the second side of the proof mass being aligned with interstices formed between the spaced apart electrodes projecting from the surface of the second cover plate, and an integral annular suspension member suspending the central portion from the annular bonding region.

According to still other aspects of the invention, a method is provided for measuring a force input along a measurement axis, the method includes electrically isolating a first pattern of upright electrodes relative to a second pattern of upright electrodes; suspending the first pattern of electrodes relative to the second pattern of electrodes for motion of the first electrodes into recesses between the second electrodes; generating a capacitance between the first and second electrodes; changing capacitance as a function of a displacement of the first pattern of electrodes relative to the second pattern of electrodes; and measuring the capacitance change.

According to another aspect of the method of the invention, suspending the first pattern of electrodes for motion relative to the second pattern of electrodes includes suspending the first pattern of electrodes for motion substantially along a measurement axis.

According to another aspect of the method of the invention, suspending the first pattern of electrodes for motion relative to the second pattern of electrodes includes substantially limiting motion of the first pattern of electrodes to motion along a measurement axis.

According to another aspect of the method of the invention, the method also includes limiting the motion of the first pattern of electrodes relative to the second pattern of electrodes.

According to still another aspect of the method of the invention, the method also includes electrically isolating a third pattern of upright electrodes relative to a fourth pattern of upright electrodes; suspending the third pattern of electrodes in combination with the first pattern of electrodes and relative to the fourth pattern of electrodes for motion of the third electrodes into recesses between the fourth electrodes; generating a capacitance between the third and fourth electrodes; changing capacitance as a function of a displacement of the third pattern of electrodes relative to the fourth pattern of electrodes; and measuring the capacitance change due to displacement of the third pattern of electrodes relative to the fourth pattern of electrodes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
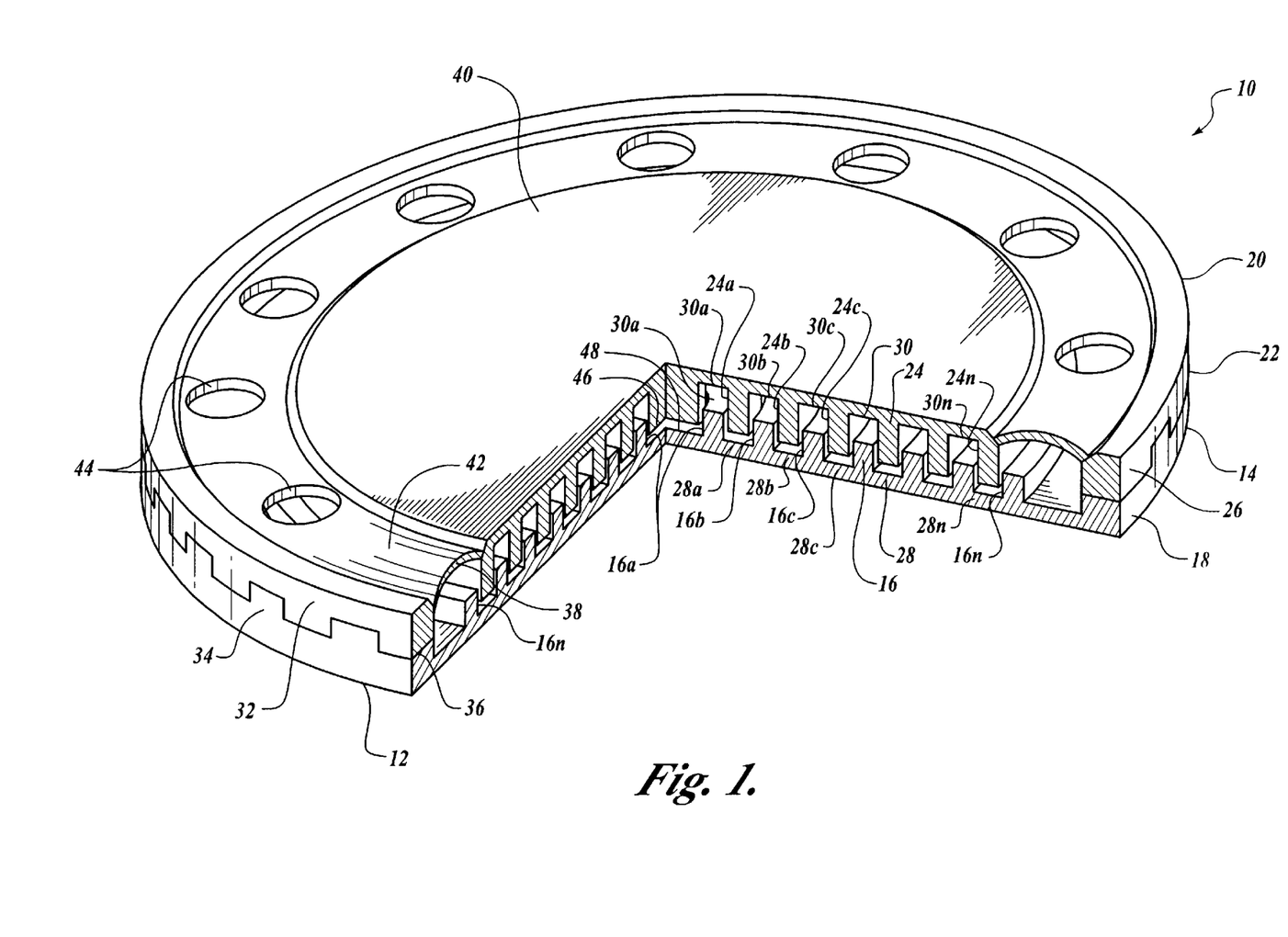
FIG. 1 is an illustration of the invention embodied as a two-layer open-loop force or acceleration sensor.

The present invention is an apparatus and method for an inexpensive force measurement device having high pickoff sensitivity in a high-G input range which can survive and operate in a high-G shock environment. As is shown in FIG. 1 and described in more detail below, the present invention is thus embodied as a low-cost, two-layer force- or acceleration-sensing device 10 that operates open-loop. The accelerometer device 10 of FIG. 1 includes a substantially circular base or cover plate 12 formed in a substantially planar semiconductor substrate 14 with a pattern 16 of multiple spaced apart, electrically conductive pick-off members or electrodes 16a, 16b, 16c through 16n extending outwardly from a central portion of one of the planar surfaces. An annular ridge portion 18 on the peripheral edge of the cover plate 12 is structured as a bonding surface.

A substantially circular proof mass 20 is formed in another substantially planar semiconductor substrate 22 with a second pattern 24 of multiple spaced apart, electrically conductive pick-off members or electrodes 24a 24b, 24c through 24n extending outwardly from a central portion of one of the planar surfaces. The second pattern 24 of pick-off electrodes is structured to be offset relative to the first pattern 16 of pick-off electrodes formed in the cover plate 12. The second pattern 24 of pick-off electrodes is thus structured to cooperate with the pick-off electrodes 16 formed on the cover plate 12. The peripheral edge of the proof mass 20 is provided with an annular ridge portion 26 that is structured as a bonding surface that cooperates with the peripheral bonding surface 18 to secure the proof mass to the cover plate 12 with the pick-off electrodes 24 on the proof mass aligned in offset fashion relative to the pick-off electrodes 16 on the cover plate 12.

The peripheral ridge portions 18, 26 are recessed below the respective pick-off electrodes 16, 24 of one or both the cover plate 12 and the proof mass 20 to such extent that the second pick-off electrodes 24 on the proof mass 20 pass between and overlap the first pick-off electrodes 16 on the cover plate 12 like the teeth of two combs. When acceleration or another force causes the proof mass 20 to deflect toward or away from the cover plate 12, a capacitance formed between the first and second pick-off electrodes 16, 24 changes, and an analog signal representative of the input force or acceleration is output to a pattern of electrical signal lines or traces (not shown) formed by conventional means on the peripheral ridge portion 18, 26 of either the cover plate 12 or the proof mass 20.

In FIG. 1 the force-sensing device 10 is a micro-machined electromechanical sensor (MEMS) force or acceleration measurement device fabricated by conventional micromachining techniques from semiconductor material. The cover plate 12 and the proof mass 20 are formed in respective substrates 14, 22, which are both formed of a monocrystalline silicon material in a substantially planar structure, i.e., having substantially planar and parallel opposing offset upper and lower surfaces.

According to the embodiment of FIG. 1, the two cooperating patterns of pick-off electrodes 16, 24 are each formed in a plurality of concentric, spaced-apart rings of teeth projecting from the cover plate 12 and proof mass 20, respectively. The cover plate 12 and proof mass 20 are fabricated using Deep-Reaction-Ion-Etching (DRIE) techniques to form cooperating concentric circular patterns of pick-off electrodes 16, 24 that overlap when assembled. When assembled, the concentric ring-shaped pick-off electrodes 24a–24n on the proof mass 20 fit in concentric patterns 28 of recesses 28a, 28b, 28c through 28n formed between the concentric ring-shaped pick-off electrodes 16 on the cover plate 12, while the concentric ring-shaped pick-off electrodes 16 on the cover plate 12 fit in concentric patterns 30 of recesses 30a, 30b, 30c through 30n formed between the concentric ring-shaped pick-off electrodes 24 on the proof mass 20. The two sets of concentric ring-shaped pick-off electrodes 16a–16n and 24a–24n thus fit together and overlap between respective recesses 30a–30n and 28a–28n like teeth on a pair of combs.

The cover plate 12 or proof mass 20 each include interlocking features or targets for aligning the two sets of pick-off electrodes 16, 24 with the respective recesses 30, 28. Alignment pits, tabs or other interlocking features are incorporated for providing and maintaining precise alignment, i.e., separation, of the two sets of pick-off electrodes 16, 24 during assembly and bonding of the cover plate 12 and the proof mass 20. For example, the annular ridge portion 26 of the proof mass 20 is provided with a pattern 32 of index steps and notches that mates with a matching pattern 34 of index steps and notches on the annular ridge portion 18 of the cover plate 12 for aligning the pick-off electrodes 24 on the proof mass 20 in offset fashion relative to the pick-off electrodes 16 formed in the cover plate 12. When configured as shown in FIG. 1, the matching patterns of index steps and notches 32, 34 provide both lateral or cross axis alignment and rotational alignment. The configuration of patterns of index steps and notches 32, 34 operate as meshed gear teeth to provide interconnecting index steps and notches cross-wise to substantially every lateral direction so that lateral and rotational alignment is assured.

The cover plate 12 and proof mass 20 are coupled together using, for example, a bonding agent, while mutual electrical isolation is maintained. A known insulating bonding agent 36 may provide electrical isolation between the cover plate 12 and proof mass 20. For example, bonding pads are located in the opposing patterns 32, 34 of indexing steps and notches around the outer edges 18, 26 of the cover plate 12 and proof mass 20. The bonding agent 36 is, for example, a perform or a glass frit material filled with separator insulating filler balls that provides substantially permanent attachment with mutual electrical isolation. The bonding together of the proof mass 20 with the cover plate 12 substantially permanently fixes the mutual relative alignment of the two sets of pick-off electrodes 16, 24.

The proof mass 20 is provided with an annular suspension member 38 coupled between a central portion 40 from which the pick-off electrodes 16 project and the annular ridge portion 26 on the periphery. The suspension member 38 includes an annular diaphragm flexure 42 formed as an annular area of reduced thickness material that is fabricated using DRIE to be integral with both the central portion 40 and the annular ridge portion 26. The material width and thickness determine the compliance or spring rate of the diaphragm flexure 42. An optional annular pattern of multiple relief holes 44 is formed, also using DRIE, through the thickness of the diaphragm flexure 42 to set initial coarse compliance.

In operation the annular diaphragm flexure 42 provides excellent circular design symmetry that results in very high input sensitivity and very low cross-axis sensitivity, which is important for highly dynamic applications. The large circumference of the annular suspension member 38 permits trade-off between sensitivity and input force or G-range capability by varying compliance, without sacrificing low cross-axis sensitivity. Furthermore, the annular structure of the suspension member 38 is relatively stiff in the plane of the suspension member, which protects it from damage when the device 10 is subjected to large lateral shock loads.

Optionally, either or both of the cover plate 12 or the proof mass 20 (shown) incorporates an adjustable center shock stop 46 for very high shock load applications. The level of shock protection provided is increased or decreased by shortening or lengthening the linear distance between the end of the shock stop pin 46 and a stop 48 on the opposite surface (shown on the cover plate 12). The stop 48 optionally projects upwardly from the surface of the cover plate 12 toward the shock stop pin 46. The gap 50 between the shock stop pin 46 and stop 48 is less than the gap between the ends of the electrodes 16, 24 and the bottoms of the corresponding recesses 30, 28 in the opposite surface. The central shock stop pin 46 and the stop 48 thus cooperate to limit the travel of the proof mass 20 relative to the cover plate 12 and provide very high shock survivability for application, such as gun-launched munitions control and guidance applications where shock survival is critical.

The pick-off electrodes 16, 24 are rendered electrically conductive by a conventional process, such as conductively doping an epitaxial surface layer on the pick-off electrodes 16, 24 of the respective silicon substrate 14, 22. The silicon substrates 14, 22 include, for example, an electrically conductive doped upper silicon or "active" layer that is electrically isolated from a respective underlying substrate by an insulating layer, or an insulating layer is applied to active layer, as shown and described in U.S. Pat. No. 5,948,981, entitled Vibrating Beam Accelerometer, issued on Sep. 7, 1999, and assigned to the Assignee of the present application, the entirety of which is incorporated herein by reference. The insulating layer may be a thin layer, e.g., about 0.1 to 10.0 micrometers, of an oxide, such as silicon oxide. The silicon substrate 14, 22 may be formed by oxidizing the active layer and underlying substrate, and adhering the two layers together. A portion of the active layer may be removed to bring the layer to the desired thickness. The silicon oxide layer retains its insulating properties over a wide temperature range to ensure effective mechanical resonator performance at high operating temperatures on the order of 100 degrees Celsius. In addition, the insulating layer inhibits undesirable etching of the active layer during manufacturing.

Alternatively, an electrically conductive material such as gold is sputter coated or otherwise deposited onto the non-doped silicon surfaces of the pick-off electrodes 16, 24.

The electrically conductive portions of the pick-off electrodes 16, 24 are coupled to the electrical signal lines formed on the peripheral ridge portion 18, 26 of one or both of the cover plate 12 and the proof mass 20. In operation the signal lines are used to supply an excitation signal to the cover plate 12 and the proof mass 20 whereby a capacitance is formed between the electrically conductive portions of the pick-off electrodes 16, 24.

Figure 2:
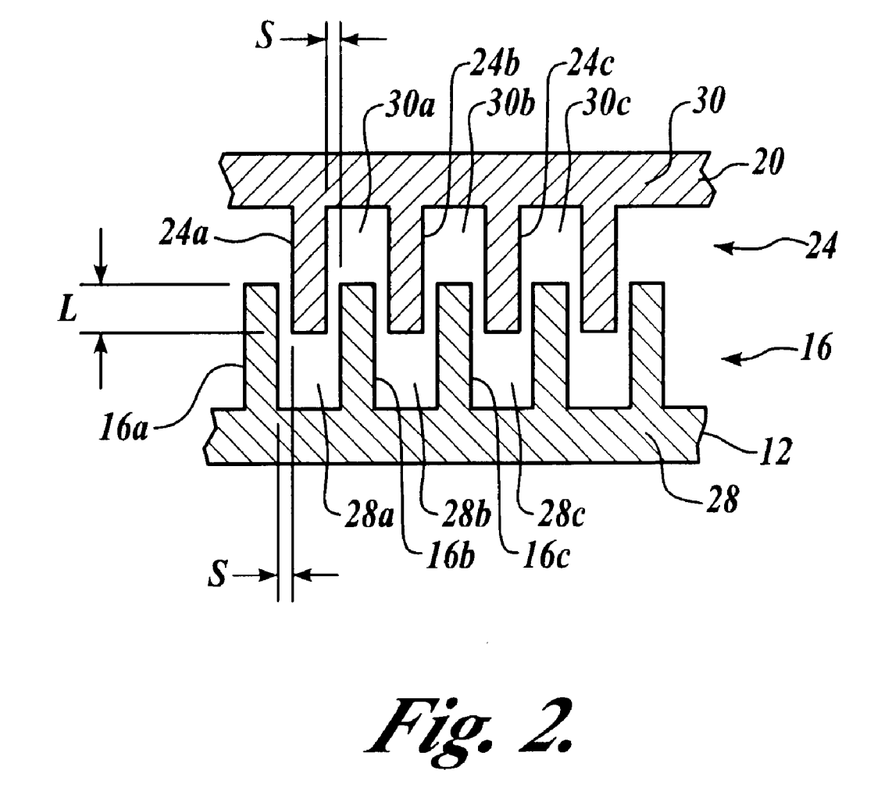
FIG. 2 illustrates the concentric rows of overlapping circular pick-off electrodes being structured with an overlapping length much greater than a wall-to-wall separation that provides optimal linear pick-off sensitivity across the desired positive-to-negative input range, while minimizing parasitic or stray capacitances.

FIG. 2 illustrates that the concentric rows of overlapping circular pick-off electrodes 16, 24 are each structured with a wall-to-wall separation S and an overlapping length L that provides optimal linear pick-off sensitivity across the desired positive-to-negative input (+/−G) range, while minimizing parasitic or stray capacitances. A portion of the electrically conductive epitaxial layer or material may be removed from the end surfaces of the pick-off electrodes 16, 24 to further minimize parasitic or stray capacitances. The recesses 28, 30 between the pick-off electrodes 16, 24 are only slightly wider than the pick-off electrodes 16, 24 that fit between so that the separations between the overlapping pick-off electrodes 16, 24 are very small as compared with the depth of the recesses 28, 30. For example, the nominal length L of overlap is in the range of about 10 to 100 times or more larger than the wall-to-wall separation S between the overlapping pick-off electrodes 16, 24. Thus, parasitic or stray capacitances at the fringe ends of the pick-off electrodes 16, 24 are minimized, and the capacitance formed between opposing faces of the alternating cover plate and proof mass pick-off electrodes 16, 24 changes substantially linearly when the pick-off electrodes 16, 24 advance into and retreat out of the recesses 28, 30 in response to positive and negative applied accelerations or other forces that deflect the proof mass 20 toward or away from the cover plate 12. The linear change in capacitance permits output of a substantially linear analog signal that is representative of the input force or acceleration The pattern of overlapping concentric circular pick-off electrodes 16, 24 results in a large pick-off area that maximizes linear capacitance pick-off sensitivity in a relatively small overall package. However, other configurations of overlapping pick-off electrodes 16, 24 are also contemplated by the invention. For example, opposing offset grids of interfitting multi-sided pins, or a grid of multi-sided pins on one of the cover plate 12 or proof mass 20 fitting into mating holes on the opposing part are also contemplated by the invention and are considered equivalent to the overlapping concentric circular pick-off electrodes 16, 24 described herein.

Forming all features using Deep-Reaction-Ion-Etching (DRIE) or other suitable etching techniques permits sensitivity, range and maximum range to be readily adjusted through processing step changes without major mask changes. As described above, dimension and configuration controls are used to adjust sensitivity, range and maximum range by using the placement, width and thickness of the diaphragm flexure 42 and the placement, number and size of the relief holes 44 to set the flexibility of the suspension member 38. The length and width and area of the conductive surfaces of the overlapping pick-off electrodes 16, 24 and width of the recesses 28, 30 determine the spacing S the overlap length L between the cooperating pick-off electrodes 16, 24. The length of the central shock stop pin 46 and the cooperating stop 48 determine the spacing therebetween and the maximum deflection of the proof mass 20 toward the cover plate 12. Both the cover plate 12 and the proof mass 20 are made more rugged by exposure to a final isotropic etch that reduces stress concentration areas.

A pattern of electrical signal lines or traces (not shown) is formed between the pick-off electrodes 16, 24 and an external surface of either the cover plate 12 or the proof mass 20 for driving the device 10 and reading an output signal.

Figure 3:
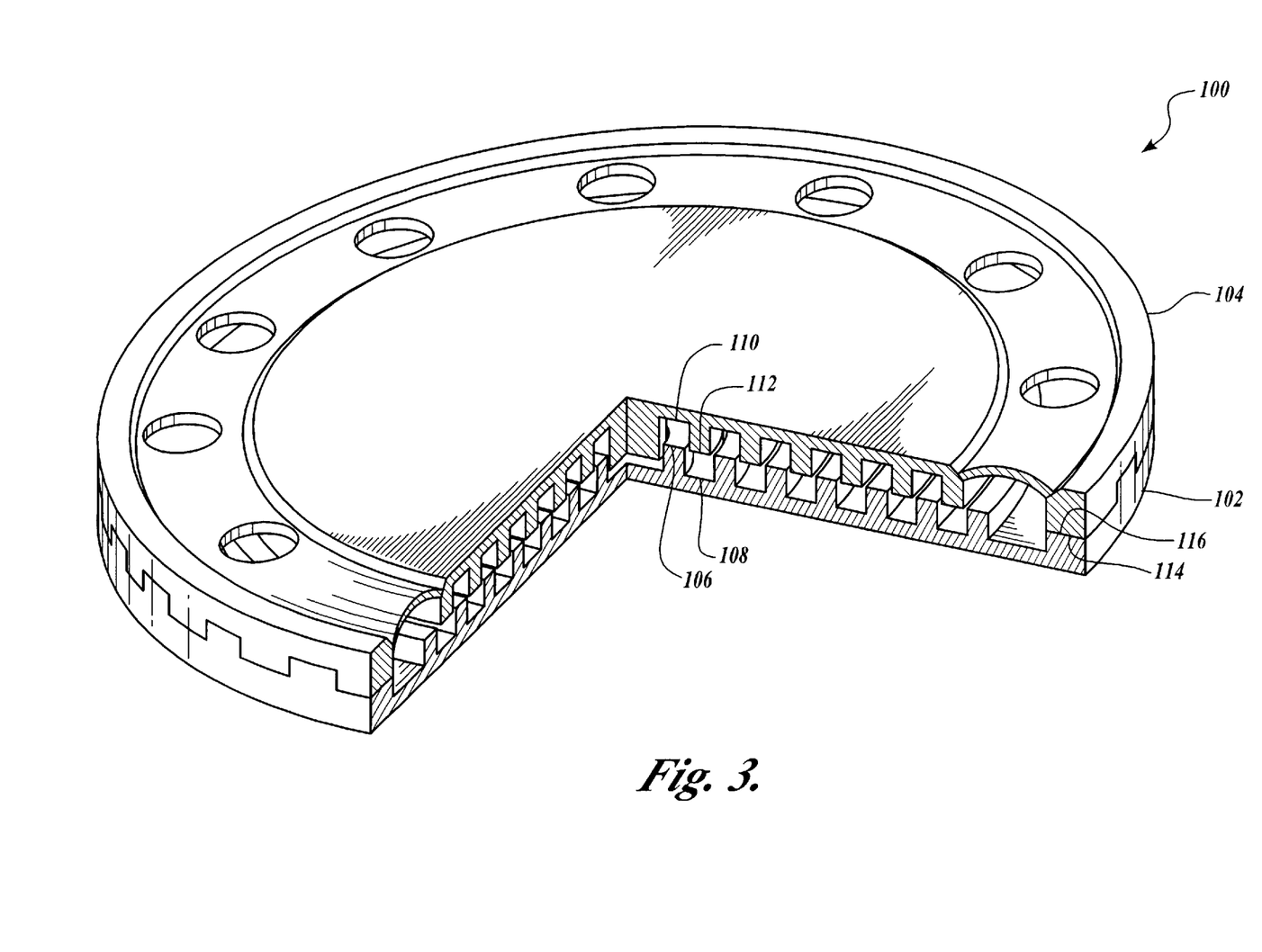
FIG. 3 is an illustration of the invention embodied as a two-layer open-loop unidirectional force or acceleration measuring device.

FIG. 3 illustrates the inexpensive force measurement device of the invention embodied as another low-cost, two-layer force-sensing or accelerometer device 100 that also operates open-loop. According to the embodiment of FIG. 3, the device 100 is formed similarly to the device 10 illustrated in FIGS. 1 and 2. However, the device 100 is substantially a unidirectional measuring device. As illustrated, the device 100 includes a base or cover plate 102 and proof mass 104. The cover plate 102 includes a pattern of pick-off electrodes 106 alternating with recesses 108 formed therebetween. The proof mass 104 includes a cooperating pattern of pick-off electrodes 110 alternating with recesses 112. The pick-off electrodes 110 and recesses 112 of the proof mass 104 being offset relative to the pick-off electrodes 106 and recesses 108 of the cover plate 102 when assembled therewith. As described above, the cover plate 102 and proof mass 104 each include a respective annular ridge portion 114 and 116 situated along a peripheral edge and including means for aligning the pick-off electrodes 106, 110 to pass into the recesses 112, 108 between the opposite pick-off electrodes 110, 106 when forced into engagement.

In contrast to the embodiment of FIGS. 1 and 2, the pick-off electrodes 106, 110 are formed even with or recessed below the respective annular ridge portion 114 and 116, so that the pick-off electrodes 106, 110 are normally disengaged from, i.e., do not enter into, the recesses 112, 108 in the opposite member. Thus, in operation, before an acceleration or other force is applied to deflect the proof mass 104 toward the cover plate 102, the pick-off electrodes 106, 110 are positioned at or near the mouth of the engaging recess 112, 108 in the opposite member, but are not entered into the recess. The capacitance formed between the outer walls of the pick-off electrodes 106, 110 and the inner walls of the respective recesses 112, 108 is at a minimum. Application of a force that flexes the suspension member 38 and deflects the proof mass 104 toward the cover plate 102 causes the a pick-off electrodes 106, 110 to move toward and into the respective recesses 112, 108 of the opposite member. An overlap between the pick-off electrodes 106, 110 and the respective recesses 112, 108 develops and increases as the deflection of the proof mass 104 increases. The deflection of the proof mass 104 toward the cover plate 102 increases as a function of the acceleration or other applied deflection force. On the other hand, retraction of the proof mass 104 away from the cover plate 102 as a function of a retracting or anti-deflection force merely increases the already existing gap between the pick-off electrodes 106, 110 and the recesses 112, 108, without significantly changing the capacitance value.

Since the capacitance increases from a nominal minimum when no force is applied and increases only when the proof mass 104 is deflected toward the cover plate 102, the device 100 is a substantially unidirectional measuring device.

Figure 4:
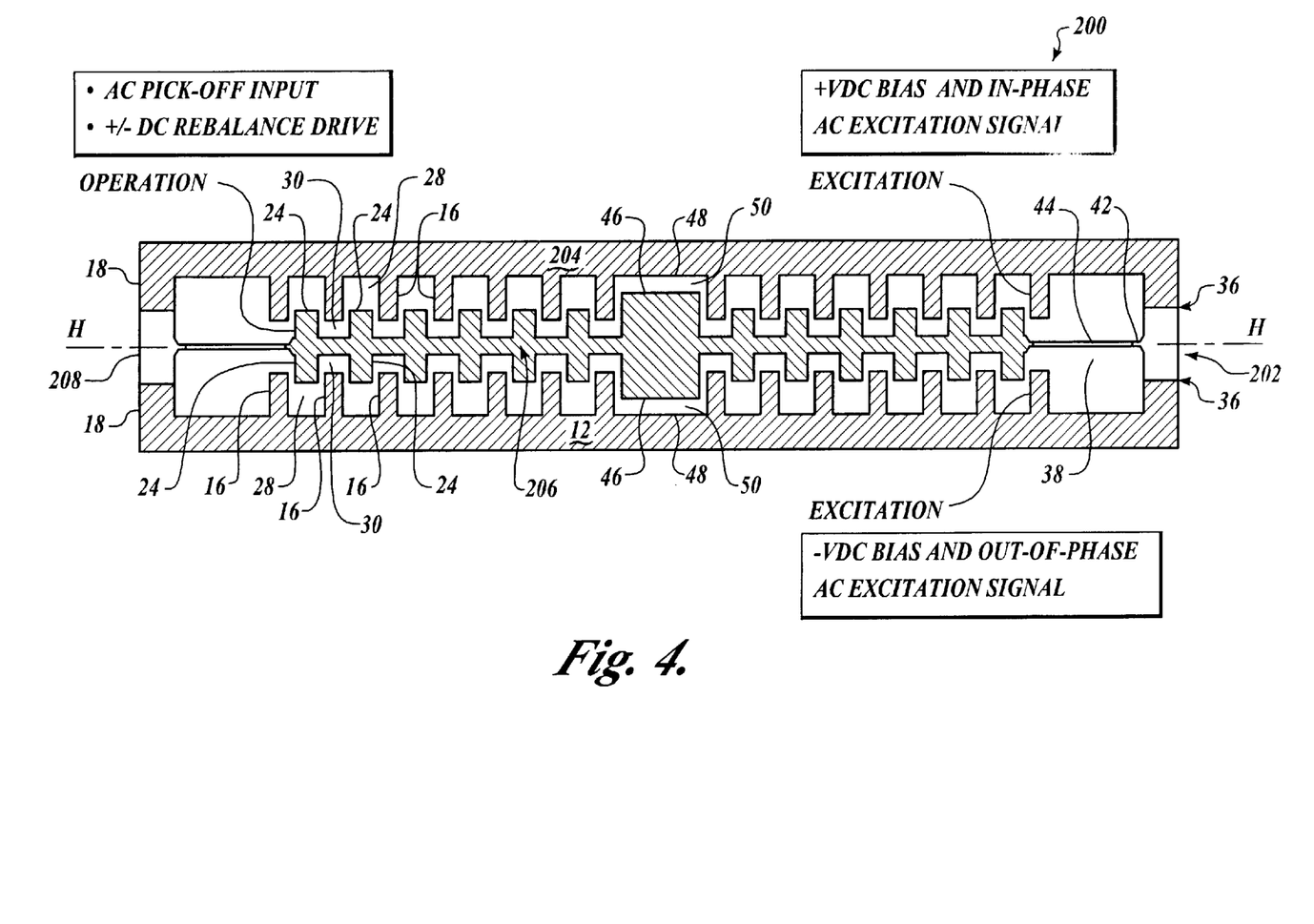
FIG. 4 an illustration of the invention embodied as a three-layer closed-loop force or acceleration sensor.

FIG. 4 illustrates the invention embodied as a three-layer force- or acceleration-sensing device 200 having double-sided, electrically conductive and overlapping pick-off electrodes, and operational elements for a closed-loop, high-performance operation. FIG. 4 is a cross-section illustration of the three layers, including the bottom cover plate 12, a double-sided proof mass 202, an additional top cover plate 204, and electronic functions for differential closed-loop operation of the device 200 for high performance applications.

The bottom cover plate 12 retains its circular configuration formed in the substrate 14 and includes the annular ridge portion 18 formed along its periphery. The annular ridge portion 18 includes the pattern 34 of index steps and notches described above for aligning pick-off electrodes 24 on the bottom side of the proof mass 202 in offset fashion relative to the capacitive pick-off electrodes 16 projecting from the bottom cover plate 12 and within the recesses 28 formed therebetween.

The top cover plate 204 is of substantially identical configuration with the bottom cover plate 12, also being of circular configuration formed in a silicon substrate 14. The top cover plate 204 includes the pattern of capacitive pick-off electrodes 16 projecting from a center portion thereof toward the double-sided proof mass 202. The annular ridge portion 18 is formed along the periphery of the top cover plate 204. The annular ridge portion 18 includes the pattern 34 of index steps and notches described above for aligning pick-off electrodes 24 on the top side of the proof mass 202 in offset fashion relative to the pick-off electrodes 16 projecting from the bottom cover plate 12 and within the recesses 28 formed therebetween.

The proof mass 202 includes a center portion 206 suspended from a second annular ridge portion 208 formed along its periphery by the suspension member 38 formed therebetween and integrally therewith. The suspension member 38 includes the annular diaphragm flexure 42, and may include part or all of the optional annular pattern of multiple relief holes 44 formed therein. The outer hoop suspension provided by the suspension member 38 results in a high cross-axis stiffness that causes the device 200 to have a very low sensitivity to cross-axis inputs. This feature is especially useful in high-G input dynamic 3-axis applications.

The center portion 206 of the proof mass includes the first pattern of capacitive pick-off electrodes 24 projecting from one side thereof toward the bottom cover plate 12 with the recesses 30 formed therebetween. The center portion 206 also includes a second pattern of capacitive pick-off electrodes 24 projecting from the opposite side thereof toward the top cover plate 204 and having a second set of the recesses 30 formed therebetween. The second set of pick-off electrodes 24 and recesses 30 are constructed in offset fashion relative to the pick-off electrodes 16 and recesses 28 on the top cover plate 204, such that the pick-off electrodes 16, 24 engage and fit into the recesses 30, 28 between the opposite members.

The annular ridge portion 208 of the proof mass 202 includes on both its bottom and top surfaces the target pattern 32 of index steps and notches described above that mates with the matching pattern 34 along the periphery of the bottom and top cover plates 12, 204. As described above, the target patterns 32 on the bottom and top surfaces of the ridge portion 208 cooperate with the matching target patterns 34 on the bottom and top cover plates 12, 204 to align the pick-off electrodes 24 and recesses 30 on the bottom and top surfaces of the proof mass 202 with the recesses 28 and pick-off electrodes 16 on the respective bottom and top cover plates 12, 204.

Optional shock stop pins 46 are formed on the top and bottom surfaces of the proof mass 202, and shock stops 48 are formed on the opposing bottom and top cover plates 12, 204, shown and as described above. Alternatively, the shock stops 48 are formed on both sides of the proof mass 202 and the shock stop pins 46 are formed on the opposing surfaces of the bottom and top cover plates 12, 204. Gaps 50 between the shock stop pins 46 and stops 48 are less than the gaps between the ends of the electrodes 16, 24 and the bottoms of the corresponding recesses 30, 28 in the opposite surface. The central shock stop pin 46 and the stop 48 thus cooperate to limit the travel of the proof mass 202 relative to the bottom and top cover plates 12, 204.

The three parts of the three-layer force-sensing device, the proof mass 202 and bottom and top cover plates 12, 204, are bonded into a single compact unit using the known insulating bonding agent 36 and the techniques described above, with modifications that account for the additional layer. As described above, the bonding process also ensures electrical isolation between the electrically conductive surfaces of the proof mass 202 and the electrically conductive surfaces of each of the bottom and top cover plates 12, 204.

In the assembled device 200, the proof mass 202 is substantially centered between the bottom and top cover plates 12, 204 such that the first and second patterns of capacitive pick-off electrodes 24 projecting from the opposing surfaces of the center portion 206 overlap with the capacitive pick-off electrodes 16 projecting from the respective top and bottom cover plates 12, 204 to substantially the same degree so that, when the proof mass 202 is at rest, the capacitance between the pick-off electrodes 16 on the bottom cover plate 12 and the pick-off electrodes 24 on the bottom surface of the proof mass 202 are substantially equal to the capacitance between the pick-off electrodes 16 on the top cover plate 204 and the pick-off electrodes 24 on the top surface of the proof mass 202. The assembled device 200 is thus of substantially symmetrical configuration about a horizontal axis H passing through the center of the double-sided proof mass 202.

A pattern of electrical signal lines or traces (not shown) is formed between the pick-off electrodes 16, 24 and an external surface of either the cover plate 12 or the proof mass 20 for driving the device 10 and reading an output signal.

The assembled device is operated using a circuit of a commonly known type for applying time varying voltages to each capacitor so that the currents flowing through the capacitors can be used as a measure of the difference in capacitance due to deflection of the proof mass 202 from its position midway between the capacitor plates formed on the bottom and top cover plates 12, 204. The capacitor plates formed by the electrically conductive surfaces of the electrodes 16 of the bottom and top cover plates 12, 204 form part of the sensing circuit for detecting the position of the proof mass 202.

The accelerometer thus includes a sensing circuit for sensing the position of the proof mass 202 relative to the bottom and top cover plates 12, 204, a first capacitor plate is formed on the conductive surfaces of the electrodes 24 on one surface of the proof mass 202, and a second capacitor plate is formed on the adjacent conductive surfaces of the electrodes 16 on one of the bottom and top cover plates 12, 204. A third capacitor plate is formed on the conductive surfaces of the electrodes 24 on the other surface of the proof mass 202, and a fourth capacitor plate is formed on the adjacent conductive surfaces of the electrodes 16 on the other one of the bottom and top cover plates 12, 204. The sensing circuit measures the capacitance between the first and second plates and between the third and fourth plates. The capacitance change measured by the sensing circuit is caused by movement of the proof mass 202 relative to the bottom and top cover plates 12, 204, which is a measure of the force or acceleration applied to the device 200.

Close loop operation of the three-layer force or acceleration sensor shown in FIG. 4 is achieved by rebalancing of the proof mass 202. The outer cover plates 12, 204 and their pick-off electrodes 16 are operated in opposition. One of the cover plates 12, 204 is excited by in-phase and the other by out-of-phase time varying or AC excitation, and one plate is injected with a positive DC bias voltage +VDC, while the other plate is injected with a negative DC bias voltage −VDC. Each of the opposing sides of the proof mass 202 is a pickup for one of the in-phase and out-of-phase excitation signals from the corresponding bottom or top cover plate 12, 204. For example, at proof mass electrical null, the pick-off signals are balanced and the demodulated error signal is at null (0 volts). In response to an acceleration or force input, the proof mass 202 is displaced, which causes an imbalance in the picked up excitation signals on the opposing sides of the proof mass 202 and a demodulated error signal results. The error signal is amplified and a response is shaped using a conventional electronic circuit to provide a positive + or negative − voltage that imparts differential push-pull electrostatic rebalance forces in conjunction with the +/−DC biases presented on the outer plates 12, 204. The rebalance forces differentially force the proof mass 202 back to approximate null, and a measurement of the electronic charge or voltage required to maintain the proof mass 202 in the null position is the record of the acceleration or force applied to the sensor 200.

While the preferred embodiment of the invention has been illustrated and described, it will be appreciated that various changes can be made therein without departing from the spirit and scope of the invention.

What is claimed is:

1. A force-sensing device comprising:
   a cover plate having an inner portion and an outer portion, the inner portion being formed with a plurality of first spaced apart electrodes projecting therefrom and defining first spaces therebetween; and
   a proof mass including:
      a substantially round inner portion being formed with a plurality of second spaced apart electrodes projecting therefrom and defining second spaces therebetween,
      a substantially round outer portion being coupled to the outer portion of the cover plate with the second electrodes being electrically isolated from the first electrodes, and the second electrodes and spaces being aligned with the first electrodes and spaces such that, when the inner portion of the proof mass is deflected toward the inner portion of the cover plate, the second electrodes pass into the first spaces and the first electrodes pass into the second spaces, and
      a flexible annular suspension member coupled between the inner and outer portions.

2. The device of claim 1 wherein the flexible suspension member further comprises an annular flexure having a compliance tuned by a plurality of passages formed therethrough.

3. The device of claim 1 wherein the outer portions of the cover plate and proof mass further comprise annular ring portions substantially surrounding the respective inner portions.

4. The device of claim 1 wherein the respective inner portions of the cover plate and proof mass further comprise substantially round regions.

5. The device of claim 1 wherein the first and second spaced apart electrodes each further comprise a plurality of concentric rings.

6. The device of claim 1 wherein the outer portion of each of the cover plate and the proof mass further comprise cooperating structure for aligning the second electrodes and spaces with the first electrodes and spaces.

7. The device of claim 1, further comprising a second cover plate having an inner portion and an outer portion, the inner portion being formed with a plurality of third spaced apart electrodes projecting therefrom and defining third spaces therebetween; and wherein the proof mass includes:
   a first and second side, the first side being formed with the plurality of second spaced apart electrodes, and the second side being formed with a plurality of fourth spaced apart electrodes projecting therefrom and defining fourth spaces therebetween, the second and fourth electrodes being mutually electrically isolated, and
   an outer portion being coupled to the outer portion of the second cover plate with the fourth electrodes being electrically isolated from the third electrodes, and the fourth electrodes and spaces being aligned with the third electrodes and spaces such that, when the inner portion of the proof mass is deflected toward the inner portion of the second cover plate, the fourth electrodes pass into the third spaces and the third electrodes pass into the fourth spaces.

8. A force-sensing device comprising:
   a cover plate having substantially planar and parallel opposing offset first and second surfaces, the first surface including a first upright pattern of interspaced electrodes substantially surrounded by a peripheral edge portion; and
   a substantially round proof mass having substantially planar and parallel opposing offset first and second surfaces, the first surface including a second upright pattern of interspaced electrodes substantially surrounded and being suspended by an annular diaphragm flexure from a peripheral edge portion, the interspaced electrodes of the second pattern being structured to pass between the interspaced electrodes of the first pattern; and
   a bonding agent coupled between the peripheral edge portion of the cover plate and the peripheral edge portion of the proof mass.

9. The device of claim 8 the bonding agent further comprises an electrical isolator between the first and second electrodes.

10. The device of claim 8 the peripheral edge portions of each of the cover plate and the proof mass further comprises an upright annular ridge portion.

11. The device of claim 8 wherein the pattern of first interspaced electrodes and the pattern of second interspaced electrodes further comprise respective first and second patterns of cooperating concentric, spaced-apart ring electrodes.

12. The device of claim 8, further comprising:
   a second cover plate having substantially planar and parallel opposing offset first and second surfaces, the first surface including a third upright pattern of interspaced electrodes substantially surrounded by a peripheral edge portion; and
   a bonding agent coupled between the peripheral edge portion of the second cover plate and a peripheral edge portion of the second surface of the proof mass; and
   wherein the second surface of the proof mass further includes a fourth upright pattern of second interspaced electrodes substantially surrounded and being suspended by the diaphragm flexure from the peripheral edge portion of the second surface, the interspaced electrodes of the fourth pattern being structured to pass between the interspaced electrodes of the third pattern.

13. A force sensor comprising:
   a means for electrically isolating a first pattern of upright electrodes relative to a second pattern of upright electrodes;

a means for annularly suspending the first pattern of electrodes relative to the second pattern of electrodes for motion of the first electrodes into recesses between the second electrodes by suspending a reaction mass having the first pattern of electrodes projecting therefrom from an annular ridge portion by an annular diaphragm flexure;

a means for generating a capacitance between the first and second electrodes; and a means for measuring a change of capacitance as a function of a displacement of the first pattern of electrodes relative to the second pattern of electrodes.

14. The sensor of claim 13 wherein the means for suspending the first pattern of electrodes for motion relative to the second pattern of electrodes further comprises a means for aligning the first pattern of electrodes relative to the second pattern of electrodes.

15. The sensor of claim 14 wherein the means for aligning the first pattern of electrodes relative to the second pattern of electrodes further comprises means for laterally aligning the first pattern of electrodes relative to the second pattern of electrodes.

16. The sensor of claim 14 wherein the means for aligning the first pattern of electrodes relative to the second pattern of electrodes further comprises means for rotationally aligning the first pattern of electrodes relative to the second pattern of electrodes.

17. The sensor of claim 13 wherein the means for suspending the first pattern of electrodes for motion relative to the second pattern of electrodes further comprises a means for restricting the motion of the first pattern of electrodes to motion substantially along a measurement axis.

18. The sensor of claim 13, wherein the means for annularly suspending the first pattern of electrodes relative to the second pattern of electrodes further comprises suspending the reaction mass from the annular ridge portion by completely surrounding the reaction mass by the annular diaphragm flexure.

19. The sensor claim 13, further comprising a means for electrically isolating a third pattern of upright electrodes relative to a fourth pattern of upright electrodes; and wherein:
the means for suspending the first pattern of electrodes relative to the second pattern of electrodes further comprises a means for suspending the third pattern of electrodes in combination with the first pattern of electrodes and relative to the fourth pattern of electrodes for motion of the third electrodes into recesses between the fourth electrodes;

the means for generating a capacitance between the first and second electrodes further comprises a means for generating a capacitance between the third and fourth electrodes; and the means for measuring a change of capacitance as a function of a displacement of the first pattern of electrodes relative to the second pattern of electrodes further comprises a means for measuring a change of capacitance as a function of a displacement of the third pattern of electrodes relative to the fourth pattern of electrodes.

20. A double-layer force sensor comprising:

first and second substantially round semiconductor substrates each having substantially planar and parallel opposing offset top and bottom surfaces;

a bottom cover plate formed in the first substrate, the bottom cover plate including:

a pattern of upright and spaced apart electrodes projecting from a central portion of the top surface, and an upright annular ridge portion projecting from a peripheral edge portion of the top surface; and a proof mass formed in the second substrate, the proof mass including:

a cooperating upright annular ridge portion projecting from a peripheral edge portion of the bottom surface and being fixed to the ridge portion of the bottom cover plate, a substantially round central portion flexibly suspended from the annular ridge portion by an annular diaphragm flexure, and a cooperating pattern of upright and spaced apart electrodes projecting from the central portion of the bottom surface and offset relative to the pattern of electrodes on the top surface of the bottom cover plate such that the cooperating pattern of electrodes passes between the pattern of electrodes on the bottom cover plate when the cooperating annular ridge portion of the proof mass is engaged with the annular ridge portion on the top surface of the bottom cover plate.

21. The sensor of claim 20 wherein the annular diaphragm flexure suspending the central portion from the annular ridge portion substantially completely surrounds the central portion and further comprises a plurality of compliance tuning passages formed therethrough.

22. The sensor of claim 20 wherein the pattern of electrodes on the top surface of the bottom cover plate and the cooperating pattern of electrodes on the bottom surface of the proof mass each further comprise a concentric pattern of circular electrodes.

23. The sensor of claim 20 further comprising an insulating bonding agent fixing the cooperating annular ridge portion on the bottom surface of the proof mass with the annular ridge portion of the top surface of the bottom cover plate.

24. The sensor claim 20 further comprising:

a third substantially round semiconductor substrate having substantially planar and parallel opposing offset top and bottom surfaces;

a top cover plate formed in the third substrate, the top cover plate including:

a pattern of upright and spaced apart electrodes projecting from a central portion of the bottom surface, and an upright annular ridge portion projecting from a peripheral edge portion of the bottom surface; and wherein the proof mass further comprises:

a cooperating upright annular ridge portion projecting from a peripheral edge portion of the top surface and being fixed to the ridge portion on the bottom surface of the top cover plate, and a cooperating pattern of upright and spaced apart electrodes projecting from a central portion of the top surface and being offset relative to the pattern of electrodes on the bottom surface of the top cover plate such that the cooperating pattern of electrodes passes between the pattern of electrodes on the top cover plate when the cooperating annular ridge portion on the top surface of the proof mass is engaged with the annular ridge portion on the bottom surface of the top cover plate.

25. The sensor of claim 24 wherein the pattern of electrodes on the bottom surface of the top cover plate and the cooperating pattern of electrodes on the top surface of the proof mass each further comprise a concentric pattern of circular electrodes.

26. The sensor of claim 24, further comprising an insulating bonding agent fixing the cooperating annular ridge portion on the top surface of the proof mass with the annular ridge portion on the bottom surface of the top cover plate.

27. A three-layer force sensor, comprising:
  first and second cover plates each formed in respective first and second substantially round semiconductor substrates having substantially planar and parallel opposing offset first and second surfaces, one of the first and second surfaces of each of the first and second cover plates having:
    an annular bonding region, and
    a central portion positioned within the annular bonding portion and having a plurality of upright and spaced apart electrodes projecting therefrom; and
  a proof mass positioned between the first surface of the first cover plate and the first surface of the second cover plate, the proof mass being formed in a third substantially round semiconductor substrate having substantially planar and parallel opposing offset first and second surfaces, each of the first and second surfaces having:
    an annular bonding region, each of the annular bonding regions on the first and second proof mass surfaces being bonded to the annular bonding region of one of the first and second cover plates,
    a substantially round central portion positioned within the annular bonding portion and having a plurality of upright and spaced apart electrodes projecting therefrom, each of the electrodes projecting from the first side of the proof mass being aligned with interstices formed between the spaced apart electrodes projecting from the surface of the first cover plate, and each of the electrodes projecting from the second side of the proof mass being aligned with interstices formed between the spaced apart electrodes projecting from the surface of the second cover plate, and
    an integral annular suspension member suspending the central portion from the annular bonding region.

28. The sensor of claim 26 wherein:
  the plurality of upright and spaced apart electrodes projecting from the first and second cover plates further comprise respective first and second pluralities of upright and spaced apart concentric ring electrodes; and
  the plurality of upright and spaced apart electrodes projecting from the first and second surfaces of the proof mass further comprise respective third and fourth pluralities of upright and spaced apart concentric ring electrodes arranged to cooperate with the respective first and second pluralities of upright and spaced apart concentric ring electrodes of the first and second cover plates.

29. A method for measuring a force input along a measurement axis, the method comprising:
  electrically isolating a first pattern of upright electrodes relative to a second pattern of upright electrodes;
  annularly suspending the first pattern of electrodes relative to the second pattern of electrodes for motion of the first electrodes into recesses between the second electrodes by suspending a substantially round reaction mass having the first pattern of electrodes projecting therefrom from an annular ridge portion by an annular diaphragm flexure;
  generating a capacitance between the first and second electrodes;
  changing capacitance as a function of a displacement of the first pattern of electrodes relative to the second pattern of electrodes; and
  measuring the capacitance change.

30. The method of claim 29 wherein suspending the first pattern of electrodes for motion relative to the second pattern of electrodes further comprises suspending the first pattern of electrodes for motion substantially along a measurement axis.

31. The method of claim 29, further comprising limiting the motion of the first pattern of electrodes relative to the second pattern of electrodes.

32. The method of claim 29 wherein suspending the first pattern of electrodes for motion relative to the second pattern of electrodes further comprises tuning an annular diaphragm flexure annularly suspending the first pattern of electrodes relative to the second pattern of electrodes.

33. The method of claim 29 wherein suspending the first pattern of electrodes for motion relative to the second pattern of electrodes further comprises aligning the first pattern of electrodes relative to the second pattern of electrodes.

34. The method of claim 29, further comprising:
  electrically isolating a third pattern of upright electrodes relative to a fourth pattern of upright electrodes;
  suspending the third pattern of electrodes in combination with the first pattern of electrodes and relative to the fourth pattern of electrodes for motion of the third electrodes into recesses between the fourth electrodes;
  generating a capacitance between the third and fourth electrodes;
  changing capacitance as a function of a displacement of the third pattern of electrodes relative to the fourth pattern of electrodes; and
  measuring the capacitance change due to displacement of the third pattern of electrodes relative to the fourth pattern of electrodes.

35. The sensor of claim 13, further comprising a means for tuning the means for annularly suspending the first pattern of electrodes relative to the second pattern of electrodes.

* * * * *